United States Patent [19]
Conti

[11] 4,202,530
[45] May 13, 1980

[54] METHOD FOR PULLING CABLE USING A TEAR-AWAY FEEDER TUBE

[76] Inventor: Allen C. Conti, 5294 E. 117th St., Garfield Heights, Ohio 44125

[21] Appl. No.: 966,678

[22] Filed: Dec. 5, 1978

[51] Int. Cl.² .................................. B65H 59/00
[52] U.S. Cl. ........................ 254/134.3 FT; 118/405; 118/DIG. 18; 427/434.7
[58] Field of Search ............ 254/134.3 R, 134.3 FT, 254/190 R; 174/135; 427/434 E; 118/405, DIG. 18

[56] References Cited

U.S. PATENT DOCUMENTS

| | | | |
|---|---|---|---|
| 3,038,702 | 6/1962 | Trunnell | 254/134.3 FT |
| 3,052,450 | 9/1962 | Trunnell | 254/134.3 FT |
| 4,028,473 | 6/1977 | Conti | 118/405 |
| 4,132,665 | 1/1979 | Nelson | 254/134.3 R |

*Primary Examiner*—Robert C. Watson
*Attorney, Agent, or Firm*—Thomas H. Murray; Clifford A. Poff

[57] ABSTRACT

A flexible feeder tube with a weakened longitudinal side wall is coupled at one end by a nozzle with an underground conduit while the remaining end of the feeder tube is located aboveground and joined with a lubricating collar that is split. A supply of cable has a plain end and an end equipped with connectors joined to the conductors of the cable. The plain end of the cable is joined with a pull-line that is fed from the conduit through the flexible feeder tube. The plain end of the cable is then drawn into the feeder tube while lubricant is applied to the sheathing of the cable. Pulling of the cable through the conduit is terminated before the end with the connector members contacts the feeder tube. The lubricating collar is split and held together by fasteners which are loosened so that the collar can be removed from the cable and then the feeder tube is removed from the cable by severing the feeder tube along the weakened longitudinal side wall. The feeder tube is light weight and removed laterally from the cable by the passage of the cable through the severed side wall of the feeder tube. After the feeder tube is stripped from the cable, it is discarded and the cable is then positioned so that the connector members on the trailing end are moved into a desired location relative to the conduit.

9 Claims, 4 Drawing Figures

METHOD FOR PULLING CABLE USING A TEAR-AWAY FEEDER TUBE

BACKGROUND OF THE INVENTION

This invention relates to a method for pulling a cable into a conduit when the trailing end of the cable is equipped with connectors previously coupled to the conductors of the cable. More particularly, the present invention relates to such a method wherein a length of flexible feeder tube is used to protectively deliver the cable into an underground conduit after which the feeder tube is stripped laterally from the cable by severing the feeder tube along a weakened longitudinal area in the side wall thereof.

In the placement of underground cables, particularly telephone communication cable and electric utility cable, certain procedures and precautions are necessary to protect the cable from damage during the placement operation. It is well known in the art to use a metal feeder tube for protection and guidance of the cable while fed from a supply reel to an underground conduit. Recent technology advancements to the manufacture and placement of cables have brought about the concept of joining the conductors of the cable at one end with connectors prior to the placement of the cable so that the laborious and time-consuming operations required for connecting together the ends of two cables in a single manhole are reduced to a minimum. Because of the increased cost of such cable, special facilities are needed and adequate precautions must be taken to prevent damage to the cable, particularly the sheathing thereof. Typically, for example, a telephone communication cable is about 3½ inches in diameter and the end equipped with connectors may be as large as 11 inches in diameter. Thus, conventional feeder tubes are unsuitable because it is impossible to pass the tube onto or from the end of the cable where the connectors are attached to the conductors. A conventional feeder tube had been cut longitudinally and held together by hinges at one side and latches at the other side. However, such modifications to a metal feeder tube are not adequate solutions to the problem. Alignment between the split tube parts cannot be maintained because of the weight of the feeder tube and the forces imposed upon the feeder tube during the pulling operation. As a result, the sheathing of the cable is severely damaged due to cuts by protruding edges of misaligned tube halves. Because of the forces involved, the cable must be fed very slowly through a divided feeder tube which increases an already costly placement and handling operation of the cable. The weight of a metal feeder tube is detrimental because support rigging is necessary to prevent unwanted deflections of the cable by the feeder tube.

SUMMARY OF THE INVENTION

It is an object of the present invention to provide a method for pulling cable by the leading end thereof through a length of conduit wherein the cable is protectively guided for entry into the conduit by a flexible feeder tube having a weakened longitudinal area in the side wall thereof for the removal of the feeder tube from the cable by severing the tube along the weakened area to thereby eliminate the need to pass the feeder tube from the trailing end of the cable.

It is a further object of the present invention to provide a flexible feeder tube having a weakened area or tear-line in the side wall along the longitudinal length thereof to provide a parting line to the side wall for removal of the feeder tube from a cable after pulling into a conduit so as to eliminate the need for removal of the feeder tube from the trailing end of the cable.

More particularly, according to the present invention, there is provided a method for pulling a cable by the leading end through a length of conduit, the trailing end of the cable having connector means forming a substantial enlargement of the diameter of the cable, the method including the steps of selecting a length of flexible feeder tube having a weakened side wall segment longitudinally thereof, coupling one end of the feeder tube with one end of the conduit, pulling the leading end of the cable by a pull-line coupled thereto through the flexible feeder tube and thence along the conduit, terminating pulling of the cable before the connector means at the trailing end thereof contacts the feeder tube, removing the feeder tube from the cable by severing the feeder tube along the weakened longitudinal side wall segment, and positioning the connector means on the trailing end of the cable into a desired location relative to the conduit.

In the preferred form of the present invention, the method includes the further steps of lubricating the cable for passage through the flexible feeder tube and conduit by coupling a split collar held together by fasteners and including orifices to discharge the lubricant onto the cable. The feeder tube is preferably coupled with the conduit by a split feed nozzle. The removal of the feeder tube from the cable is preferably carried out by severing the feeder tube along a longitudinally-weakened tear-line defining the aforesaid weakened side wall segment by application of a force in a direction generally normal to the extended length of the feeder tube. The feeder tube, in its preferred form, is made of light-weight plastic material with transverse ribs for longitudinal flexibility.

These features and advantages of the present invention as well as others will be more fully understood when the following description is read in light of the accompanying drawings, in which.

Figure 1:
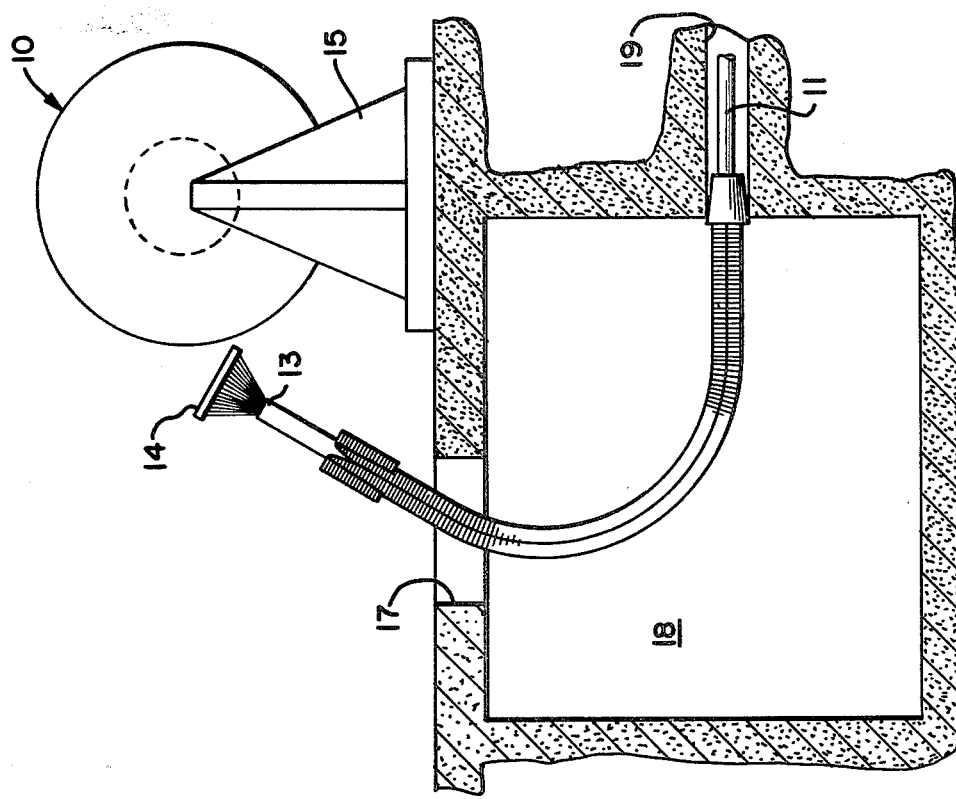
FIG. 1 is an elevational view showing the use of the flexible feeder tube of the present invention for drawing a cable into an underground conduit.
Figure 2:
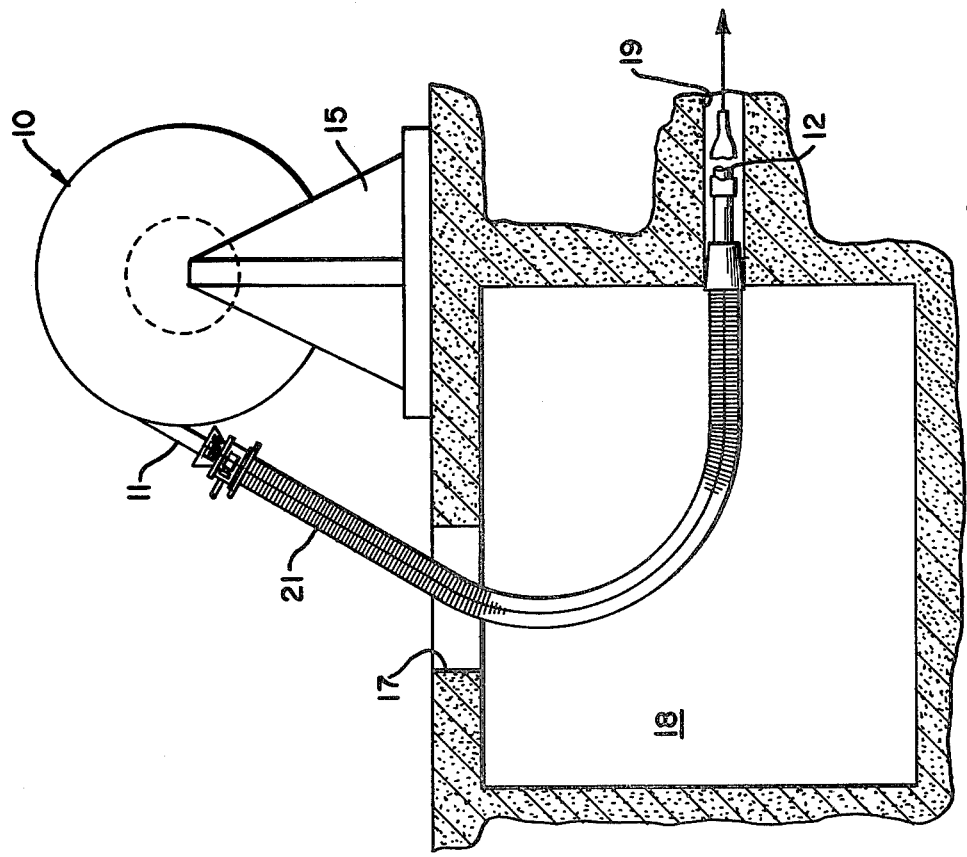
FIG. 2 is a view similar to FIG. 1 but illustrating the manner by which the flexible feeder tube is removed from the cable.
Figures 3, 4:
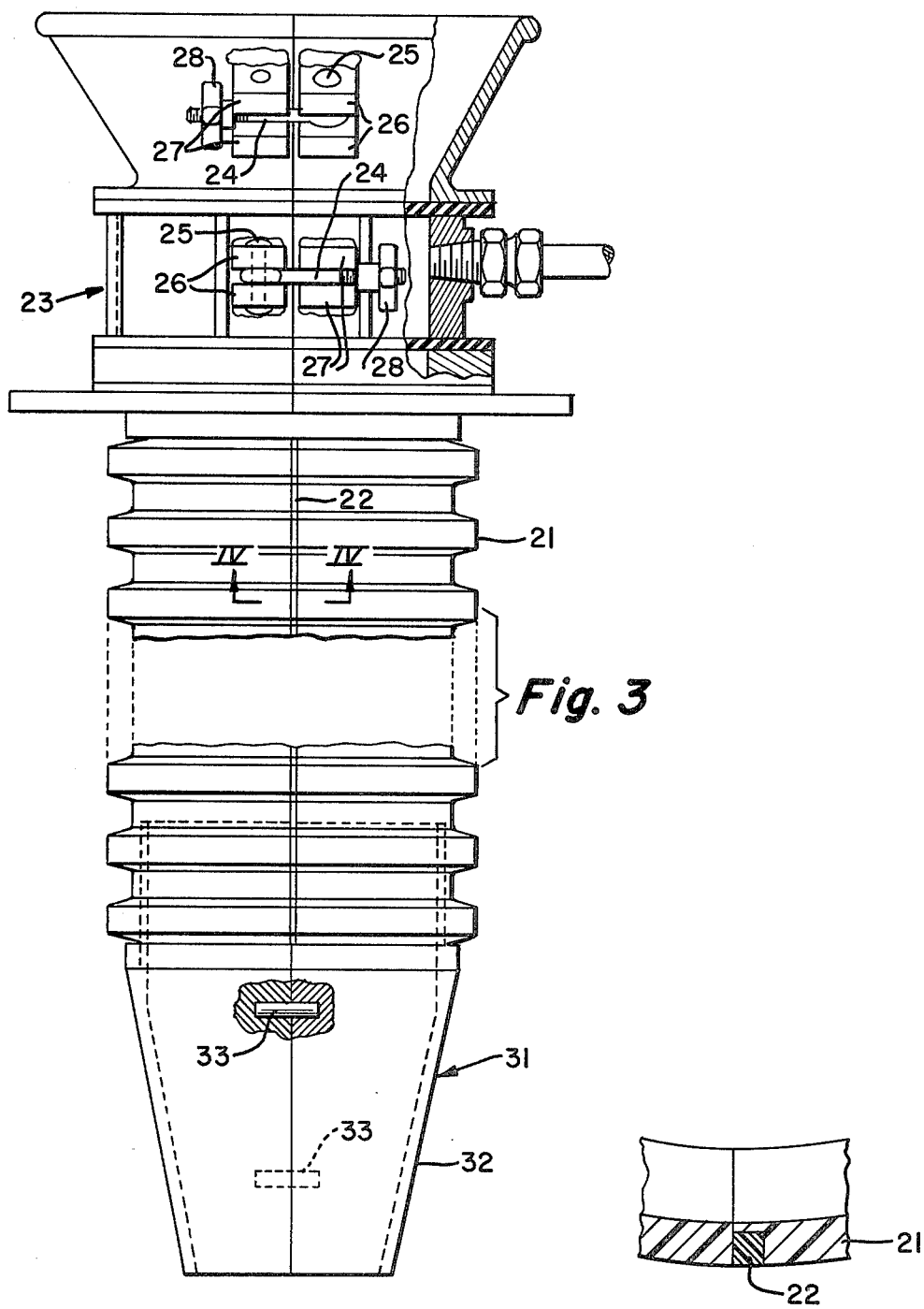
FIG. 3 is an enlarged view of the flexible feeder tube illustrated in FIGS. 1 and 2.
FIG. 4 is an enlarged sectional view of the feeder tube shown in FIGS. 1–3 to illustrate the weakened side wall portion thereof.

In FIG. 1, there is illustrated a typical arrangement of apparatus employed for carrying out the method of the present invention. Reference numeral 10 identifies a supply reel used for transporting a length of cable 11 which is coiled about an arbor of the reel in a manner to present a plain leading end 12 during the uncoiling operation and a trailing end 13 which is provided with connector members 14 (FIG. 2) previously joined with the conductors extending from the sheathing of the cable. Saddle supports 15 carry the supply reel for rotation about a horizontally-arranged shaft. For the purpose of disclosing the present invention, it will be assumed that the supply reel contains a length of cable of the type commonly used for telephone communications in which the cable is comprised of an outer plastic sheathing used to protect a multiplicity of conductors. At the trailing end of the cable, the conductors are joined with connector members. There may be as many as 2700 pairs of conductors in a single sheathing of the cable whereby the physical size of the connectors 14 at the trailing end of the cable defines a substantial enlargement, e.g., up to about 11 inches over the diameter of the cable, e.g., to 3½ inches. The supply reel is supported adjacent a manhole opening 17 leading to an underground work area 18 wherein an underground conduit 19 defined by a buried PVC pipe, for example, communicates with the work area. The conduits may be formed of numerous well-known structures. In carrying out the method of the present invention, a length of flexible feeder tube 21 is selected to guide and protect the cable during the passage from the supply reel 10 into the conduit 19. As best shown in FIGS. 3 and 4, a length of feeder tube which is selected has a continuous side wall with a ribbed configuration transversely to the length of the feeder tube to provide flexibility in the longitudinal direction. The side wall of the feeder tube includes a weakened segment 22 extending in the longitudinal direction of the feeder tube. The weakened segment 22 preferably takes the form of coextruded insert material adhered to the material forming the side wall of the tube. For example, high-density polyethylene is one form of material that is useful for producing the flexible feeder tube 21. A different polyethylene material is then chosen to form the insert 22. A weakened longitudinal segment to the side wall of the flexible feeder tube may be formed by alternative measures including, for example, providing a thinned wall section during molding or extrusion of the feeder tube. While the feeder tube may be constructed of different materials and in different manners, the feeder tube must have at least a substantially continuous internal side wall surface to eliminate possible damage to the cable while passing through the feeder tube. Moreover, the feeder tube must have a weakened side wall segment along its longitudinal length to provide a longitudinal parting line to the side wall.

One end of the flexible feeder tube 21 is joined with a lubricating collar 23 for discharge of a suitable lubricant onto the surface of the cable. One form of collar suitable for use in carrying out the method of the present invention is shown in U.S. Pat. No. 4,028,473. It is necessary, however, that the lubricating collar 23 be split longitudinally and provided with fastening means for joining together the halves of the split collar. In FIG. 3, threaded bolts 24 have an eyelet at one end held by a pivot shaft 25 to one-half of the collar by clevis plates 26. Clevis plates 27 are attached to the other half of the collar for supporting engagement with a nut member 28 which is threaded onto the end of bolt 24. It is to be understood, of course, that the bolts 24 and their cooperating parts as just described are provided at both sides of the split collar to rigidly hold the collar together as a unit during the cable drawing operation. As shown in FIG. 3, the entry side of the collar includes a funnel-shaped guide and at the discharge side of the collar, an annular sleeve extends into the flexible feeder tube. The forces imposed upon the collar by the passage of a cable are sufficient to keep the collar situated at the end of the feeder tube. At the free end of the flexible feeder tube 21, a nozzle 31 has a conically-tapered portion 32 joined with a cylindrical portion that extends into the feeder tube. The nozzle is split longitudinally into two halves and dowel pins 33 extend between the halves of the nozzle to maintain alignment between the nozzle halves.

The flexible feeder tube 21 with the lubricating collar at one end and the nozzle at the other end is then joined with conduit 19 by passing the nozzle 31 and a length of the feeder tube through the opening 17 into the work area 18 and then the nozzle is joined to the conduit 19. Typically, because the feeder tube is made of plastic material that is light weight, i.e., preferably about 6 ounces per linear foot, a support rigging for the feeder tube is unnecessary. The pull-line which has been passed through conduit 19 from a distantly-located work area into work area 18 is then fed through nozzle 31, conduit 21 and lubricating collar 23. The pull-line is then secured to the leading end 12 of the cable. Supply reel 10 is then permitted to rotate as the pull-line is withdrawn along the feeder tube and into conduit 19. While this occurs, lubricant is discharged from the collar 23 onto the surface of the cable to lubricate and protect the cable while passing along the feeder tube and conduit. The length of cable which is contained on the supply reel 10 is typically chosen so that it will extend from work area 18 into a distally-arranged work area from where the pull-line extends. As the trailing end of the cable is unwound from the supply reel 10, pulling of the cable is stopped before the trailing end and connectors 14 reach the lubricating collar 23. The relationship of parts at this point is illustrated in FIG. 2. At this juncture in the method of the present invention, the lubricating collar is removed from the end of the feeder tube by sliding it along the cable toward the trailing end thereof. The nut members 22 are then rotated to release the halves of the collar. The individual halves of the collar are then removed from their surrounding relation with the cable. The feeder tube is then moved longitudinally along the cable toward the trailing end thereof by a distance which is sufficient to disengage the nozzle 31 from the duct 19. After this occurs, the nozzle is withdrawn from the end of the feeder tube. The halves of the nozzles are then separated from one another and the nozzle is removed from its surrounding relation with the cable. The weakened longitudinal area of the feeder tube is then stressed beyond the elastic limit to sever the side wall of the feeder tube along its entire length. The feeder tube is then stripped from the cable by displacing the feeder tube laterally so that the parting line in the side wall thereof becomes the discharge line from which the cable passes from within the feeder tube. After the feeder tube is stripped from the cable, the cable is drawn into the duct 19 by a desired distance so that the terminals 14 at the end thereof are positioned in a desired location within the work area 18 for joining with the terminals of another cable which has been previously drawn into a ductwork extending in the opposite direction or will be drawn into such ductwork. After the trailing end of the two sets of cables has been positioned into a desired relation within the work area 18, the connectors on each terminal end are coupled together to provide electrical continuity between the conductors of both cables.

Although the invention has been shown in connection with a certain specific embodiment, it will be readily apparent to those skilled in the art that various changes in form and arrangement of parts may be made to suit requirements without departing from the spirit and scope of the invention.

I claim:

1. A method for pulling cable by a leading end through a length of conduit, the trailing end of the cable having connector means forming a substantial enlargement to the diameter of the cable, said method including the steps of:

selecting a length of flexible feeder tube having a weakened longitudinal side wall segment thereof, coupling one end of the feeder tube with one end of the conduit, pulling the leading end of the cable with a pull-line coupled thereto through the flexible feeder tube and thence along the conduit, terminating such pulling of the cable before the connector means at the trailing end thereof contact the feeder tube, removing the feeder tube from the cable by severing the feeder tube along the weakened longitudinal side wall segment, and positioning the connector means at the trailing end of the cable into a desired location relative to the conduit.

2. The method according to claim 1 including the further step of lubricating the cable for passage through the flexible feeder tube and conduit.

3. The method according to claim 2 wherein said lubricating the cable includes feeding pressurized lubricant onto the cable from orifices in a split collar joined together for support by the end of the feeder tube.

4. The method according to claim 1 wherein said coupling one end of the feeder tube includes arranging a split feed nozzle to couple the feeder tube with the conduit.

5. The method according to claim 1 wherein said step of removing the feeder tube is further defined to include laterally stripping the feeder tube from the cable along the weakened longitudinal tear-line defining said weakened side wall segment.

6. The method according to claim 1 wherein said selected length of feeder tube has only one longitudinal tear-line defining said weakened side wall segment.

7. The method according to claim 1 wherein said selected length of feeder tube consists of light-weight plastic material and includes transverse ribs to negate damage to the cable during said step of removing the feeder tube.

8. The method according to claim 1 wherein the selected length of feeder tube is made of thin plastic with a weight of about 6 ounces per foot to eliminate the need for rigging support.

9. The method according to claim 1 wherein the selected length of feeder tube consists of light-weight plastic material and wherein the feeder tube includes reinforcing transverse ribs having a dissimilar plastic coextrusion longitudinally in the side wall to facilitate removal of the feeder tube from the cable.

* * * * *